Feb. 16, 1926.

G. C. EKSTRÖM 1,573,232

TRANSPORTING DEVICE FOR BOXES OR THE LIKE

Filed July 2, 1923

Inventor
G.C. Ekström
By Marks & Clerk
Attys.

Patented Feb. 16, 1926.

1,573,232

UNITED STATES PATENT OFFICE.

GUNNAR CHRISTIAN EKSTRÖM, OF STOCKHOLM, SWEDEN, ASSIGNOR TO AKTIE-BOLAGET GEHR AREHNS MEKANISKA VERKSTAD, OF STOCKHOLM, SWEDEN, A CORPORATION OF SWEDEN.

TRANSPORTING DEVICE FOR BOXES OR THE LIKE.

Application filed July 2, 1923. Serial No. 649,149.

*To all whom it may concern:*

Be it known that I, GUNNAR CHRISTIAN EKSTRÖM, a subject of the King of Sweden, residing at Birger Jarlsgatan 58, Stockholm, Sweden, have invented certain new and useful Improvements in Transporting Devices for Boxes or the like, of which the following is a specification.

This invention relates to a device by means of which boxes or the like stacked in a magazine are individually withdrawn and placed in a row upon a track or path in order to be subjected to some treatment. The said device may be used also for transferring boxes etc. from a path to a second path and simultaneously changing their position for instance from a horizontal position to a vertical position or vice versa.

Figure 1:
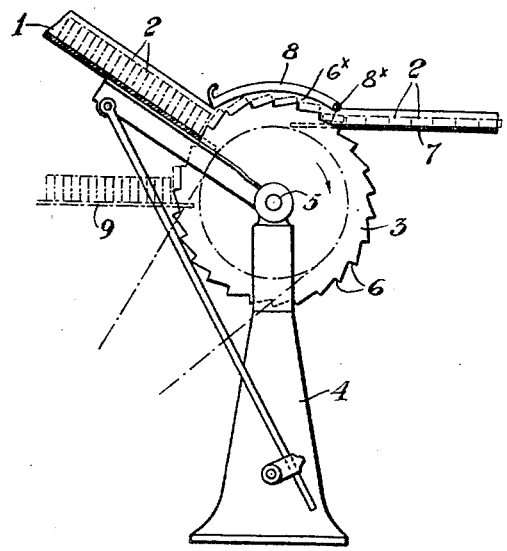
Figure 2:
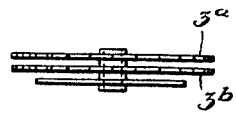

Fig. 1 of the accompanying drawing shows in a side view a transporting device arranged in accordance with this invention. Fig. 2 is a plan view of a transferring disc belonging to the said device.

1 is a magazine, in which boxes 2 are stacked. The said boxes, acted upon by their weight or by a piston, not shown, tend to move downwards toward a transferring disc 3, which by a suitable motion transmitting device is rotated in the direction indicated by the arrow and on a shaft 5 provided in a frame 4. The said disc 3 is provided with teeth, offsets or shelves 6, which during the rotation of the disc catch box by box and transfer the boxes, guided by side walls 6ˣ, to a channel 7 or the like. The bottom wall of the said channel extends onto the disc 3, so that the disc places the boxes one by one in the cannel 7 and by means of the teeth 6 pushes the row of boxes thus effected forward in the same. The boxes may then, while advanced in the channel, be subjected to some treatment. In order to prevent the boxes from getting out of order while transferred from the magazine 1 to the channel 7 a curve shaped guide bar 8 may be located above the disc 6, which bar, preferably, is pivoted for instance at 8ˣ.

The transferring disc shown in the drawing comprises two toothed discs 3ª and 3ᵇ of sheet metal and connected one with the other, the teeth of the said disc constituting by pairs the offsets or shelves mentioned above. The bottom of the channel 7 extends into the space between the discs 3ª and 3ᵇ but the channel may be so arranged, that the said bottom embraces the transferring disc, whether the disc is arranged as shown in Fig. 2 or in any other manner, provided only that the boxes etc. are so large, that they are supported by the parts of the bottom, which embrace the disc.

An endless chain, belt or the like provided with offsets or shelves and carried by stationary rollers may be substituted for the transferring disc, as easily understood by those skilled in the art. The bottom of the channel 7 or the path may be movable and for instance, consists of a conveyor belt, carried by rollers.

By rotating the disc 3 etc. in a direction opposite to that indicated by the arrow, the device described above and shown in the drawing may serve to transfer boxes from the channel or path 7 to the magazine 1 or to a second path 9, located at the opposite side of the disc 3 with respect to the path 7, as shown by dotted lines in Fig. 1. The said path 9 may be movable, if necessary. As perceived from the drawing the position of the boxes is changed from a vertical position to a horizontal one or vice versa, while transferred from one of the paths to the other one, so that the boxes may be treated on two sides while transported.

I claim:

In a device for transferring boxes or the like and changing their position from a substantially upright to a horizontal position or vice versa the combination with two supports for the boxes which are located in substantially the same plane and on which the boxes are placed in rows, of a rotary, circular member, which is located between the said supports and is provided with shelves each having two plane surfaces forming a substantially right angle with one another, the position of the rotary member being so adapted with relation to the said supports, that one of the said surfaces will catch a box while the shelf passes one of the said supports, and then together with the other surface carries the box, resting freely on the surfaces in an unvariable position relatively to the same, while transferring the box from the one support to the other support, each of the plane surfaces being able to push forwards on the support the box delivered on the same, so that the said rotary member is able to operate in both motion directions.

In testimony whereof I have affixed my signature.

GUNNAR CHRISTIAN EKSTRÖM.